(12) United States Patent
Fujisawa

(10) Patent No.: US 7,584,481 B2
(45) Date of Patent: Sep. 1, 2009

(54) DISC DEVICE

(75) Inventor: Shinichi Fujisawa, Musashino (JP)

(73) Assignee: TEAC Corporation, Tama-shi (JP)

( * ) Notice: Subject to any disclaimer, the term of this patent is extended or adjusted under 35 U.S.C. 154(b) by 299 days.

(21) Appl. No.: 10/556,235

(22) PCT Filed: May 7, 2004

(86) PCT No.: PCT/JP2004/006492

§ 371 (c)(1),
(2), (4) Date: Sep. 25, 2006

(87) PCT Pub. No.: WO2004/100129

PCT Pub. Date: Nov. 18, 2004

(65) Prior Publication Data

US 2007/0033598 A1    Feb. 8, 2007

(30) Foreign Application Priority Data

May 12, 2003  (JP) .............................. 2003-133476
Aug. 6, 2003  (JP) .............................. 2003-206322

(51) Int. Cl.
G11B 33/12    (2006.01)
(52) U.S. Cl. .................................... 720/600
(58) Field of Classification Search ........................ None
See application file for complete search history.

(56) References Cited

U.S. PATENT DOCUMENTS 5,058,045 A * 10/1991 Ma ............................. 361/683
5,067,041 A * 11/1991 Cooke et al. ................. 361/685
5,098,175 A    3/1992 Cooke et al.
5,392,192 A *  2/1995 Dunn et al. .................. 361/683
5,524,104 A *  6/1996 Iwata et al. .................. 720/652

FOREIGN PATENT DOCUMENTS

| JP | 03-152614 A | 6/1991 |
| JP | 05342827 A | 12/1993 |
| JP | 06-243670 A | 9/1994 |
| JP | 3061507 U | 6/1999 |
| JP | 2002-124063 A | 4/2002 |

* cited by examiner

Primary Examiner—Mark Blouin
(74) Attorney, Agent, or Firm—Christensen O'Connor Johnson Kindness PLLC

(57) ABSTRACT

Without increasing the volume of information device main body, it is possible to arrange two disc devices superimposed in a horizontal direction or a vertical direction in a standardized half-height drive bay, thereby enabling simultaneous drive of a plurality of optical discs and improving operability such as mounting of the optical discs. A disc device A can accept a single disc or double discs horizontally or vertically in the drive bay of half height configured in the front face of an information device. The case (1) portion of the disc device A has an external shape having a thickness 19 mm to 20.65 mm and a width 145.5 mm to 146.5 mm. Furthermore, threaded hole (1*d*) is formed in the side surface of the case (1) for mounting onto the information device main body. Moreover, when a pair of disc devices (A1, A2) configured so as to be vertically combined is made into a unitary block by opposing the cases 1, the external shape is such that matched with the opening of the drive bay.

13 Claims, 11 Drawing Sheets

DISC DEVICE

BACKGROUND OF THE INVENTION

1. Technical Field

The present invention relates to an improved disc device that records and/or reproduces information onto various optical discs.

2. Background Art

Generally, since information devices, e.g. personal computers or DVD recorders, record information onto optical discs or reproduce the information from the optical discs, disc devices are essential for the information devices. The disc devices are provided within the information devices or connected to the information devices using cables as external devices.

Among these optical discs, CD (Compact Disc), CD-ROM (Read Only Memory), DVD (Digital Versatile Disc), DVD-ROM (Read Only Memory) are exclusive to reproduce, and CD-R (Recordable), CD-RW (ReWritable), DVD-R, DVD-RW, and so on are writable (recordable).

FIG. 13 shows a desktop personal computer 101 with a built-in disc device 100 which drives an optical disc D. A conveying unit which loads/unloads a disc tray 103 is provided within a case 102, and a driving unit, such as a pickup base, which drives at the time of loading the disc tray 103 are further provided therein (for example, refer to Patent Document 1).

Since the disc device built in the personal computer has an optical pickup which is capable of corresponding to various optical discs as described above, it is possible to record and reproduce information onto/from the optical disc using only one disc device. Therefore, information devices other than the personal computer with the built-in disc device, for example, DVD recorders have a single disc device that records and reproduces information.

In the information device with a single built-in disc device as mentioned above, when recording information written in an optical disc into another optical disc, the optical disc with information recorded therein is driven by a disc device, and then the information is temporarily stored in a hard disc provided in the information device main body. Thereafter, a recording optical disc is mounted in the disc device, and the recorded information is read from the hard disc to be written in the recording optical disc. As apparently known from the above, in order to simultaneously record and reproduce information onto/from an optical disc, a recording disc device and a reproducing disc device are provided to be simultaneously driven without exchanging optical discs, to simultaneously record and reproduce information onto/from the optical discs.

Specifically, in the case of a desktop personal computer, the width of the half-height drive bay is standardized to 41.3 mm to maintain compatibility with the disc device. However, when two disc devices are provided in order to satisfy the above object, the number of the half-height drive bays increases, and the volume required to arrange the disc device is doubled, which results contradicts the object to provide a slim and thin device.

The present invention was made in consideration of these problems according to the related art, and an object of the invention is that without increasing the volume of the information device main body, it is possible to arrange two disc devices superimposed in a horizontal direction or a vertical direction in a standardized half-height drive bay, thereby enabling simultaneous drive of a plurality of optical discs.

DISCLOSURE OF INVENTION

Therefore, the above-mentioned problems can be solved by the following aspects of the invention. That is, according to a first aspect, a disc device, comprising a single disc device or a pair of the disc devices combined vertically or horizontally, being to be arranged in a half-height drive bay configured in a front face of an information device, wherein a case of the disc device has a threaded hole at a side of the case for mounting onto a main body of the information device.

According to a second aspect of the invention, in the first aspect, a bottom panel of a case of a first disc device and a top panel or a bottom panel of a case of a second disc device are integrated by a connecting member for engaging the both panel with each other to be arranged in the half-height drive bay.

According to a third aspect of the invention, the disc device can be arranged in a half-height drive bay configured vertically in a front face of an information device, and the cases of a pair of disc devices configured for combining are to be integrated by opposing the cases for having an outline being fitted in an opening of the drive bay.

According to a fourth aspect of the invention, in the third aspect, bottom panels of the cases of the disc devices are to be opposed to each other.

According to a fifth aspect of the invention, in the third aspect, the outline of the case of single disc device has a thickness of 19 mm to 20.65 mm, and a width of 145.5 mm to 146.5 mm.

According to a sixth aspect of the invention, in the first aspect, push buttons for loading/unloading the disc trays are formed at both side ends of a bezel.

BEST MODE FOR CARRYING OUT THE INVENTION

Embodiments of the invention will now be explained in detail with reference to accompanying drawings.

First Embodiment

Figure 1:
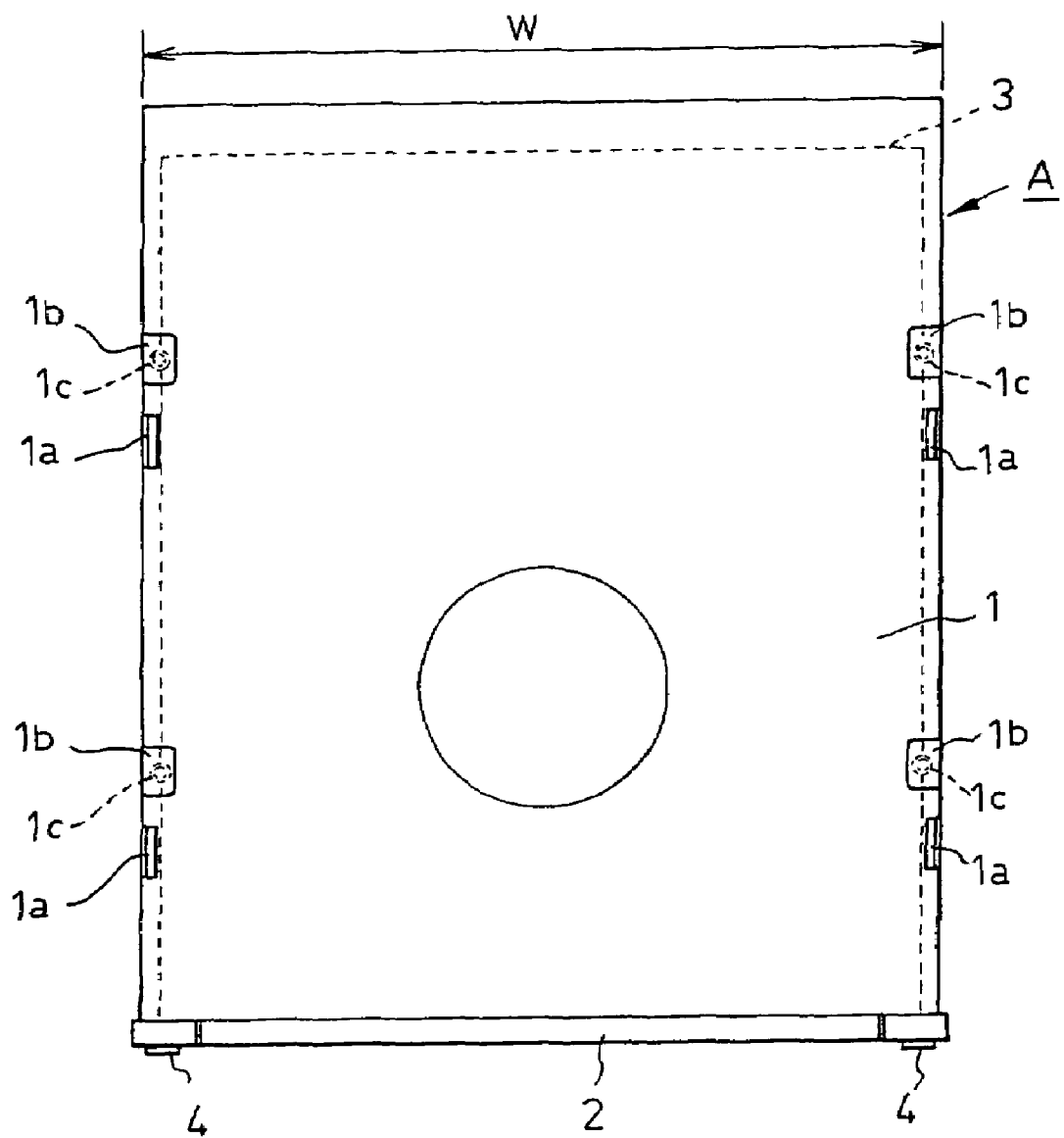
FIG. 1 is a plan view of a disc device according to an embodiment of the invention.
Figure 2:
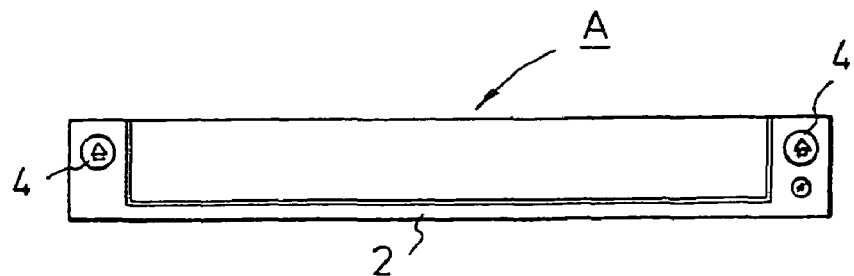
FIG. 2 is a front view of the disc device according to the embodiment of the invention.

FIG. 1 is a plan view of a disc device A according to an embodiment of the invention, and FIG. 2 is a front view thereof. In the drawings, reference numeral 1 denotes a chassis case which is a case of the disc device A and accommodates a disc tray 3 integrated with a bezel 2. Further, the chassis case 1 has a conveying unit which moves the disk tray 3 in the chassis case 1 on the basis of the instruction of loading/unloading.

At both side ends of the top panel of the chassis case 1, a slits 1a passing through the chassis case are formed, and further recessed grooves 1b which prevent contacting with heads of attaching screws when two disc devices A are superimposed as described later, are formed. Further, at positions corresponding to the recessed grooves 1b in a bottom panel of the chassis case 1, threaded holes 1c are formed.

Figure 3:
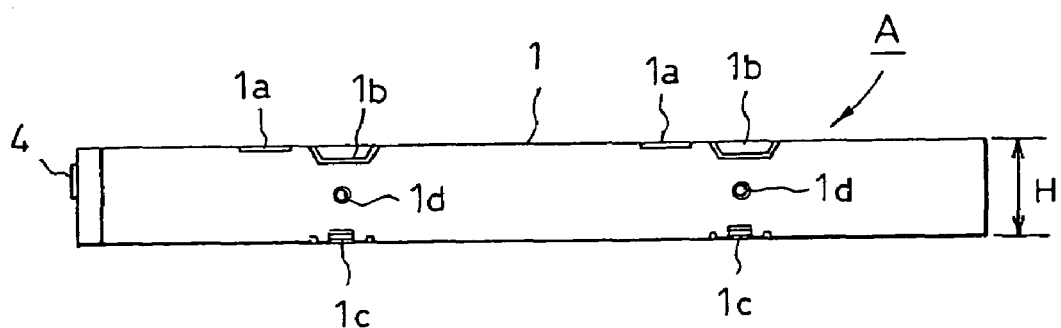
FIG. 3 is a side view of the disc device according to the embodiment of the invention.

FIG. 3 is a side view of a single disc device A, in which threaded holes 1d are formed in positions corresponding to through-holes of the inner housing provided in the information device main body P such as a personal computer, the through-holes of the inner housing and the threaded holes 1d of the chassis case 1 are simultaneously threaded to fix the disc device A to the information device main body P. The thickness H of the chassis case 1 formed as mentioned above is 19 mm to 20.65 mm and the width W thereof is 145.5 mm to 146.5 mm so as to be arranged in the half-height drive bay.

On front faces of both side ends of the bezel 2 fixed to the leading end of the disc tray 3, push buttons 4 that are used to load or unload the disc tray 3 are arranged. It is possible to load or unload the disc tray 3 even when using any of the push buttons 4. The disc device A further includes a turntable which rotatably support the optical disc, a spindle motor that rotates the turntable, an optical pickup that reads/write information from/onto the optical disc, and a driving mechanism that moves the optical pickup in a radius direction of the optical disc.

Figure 4:
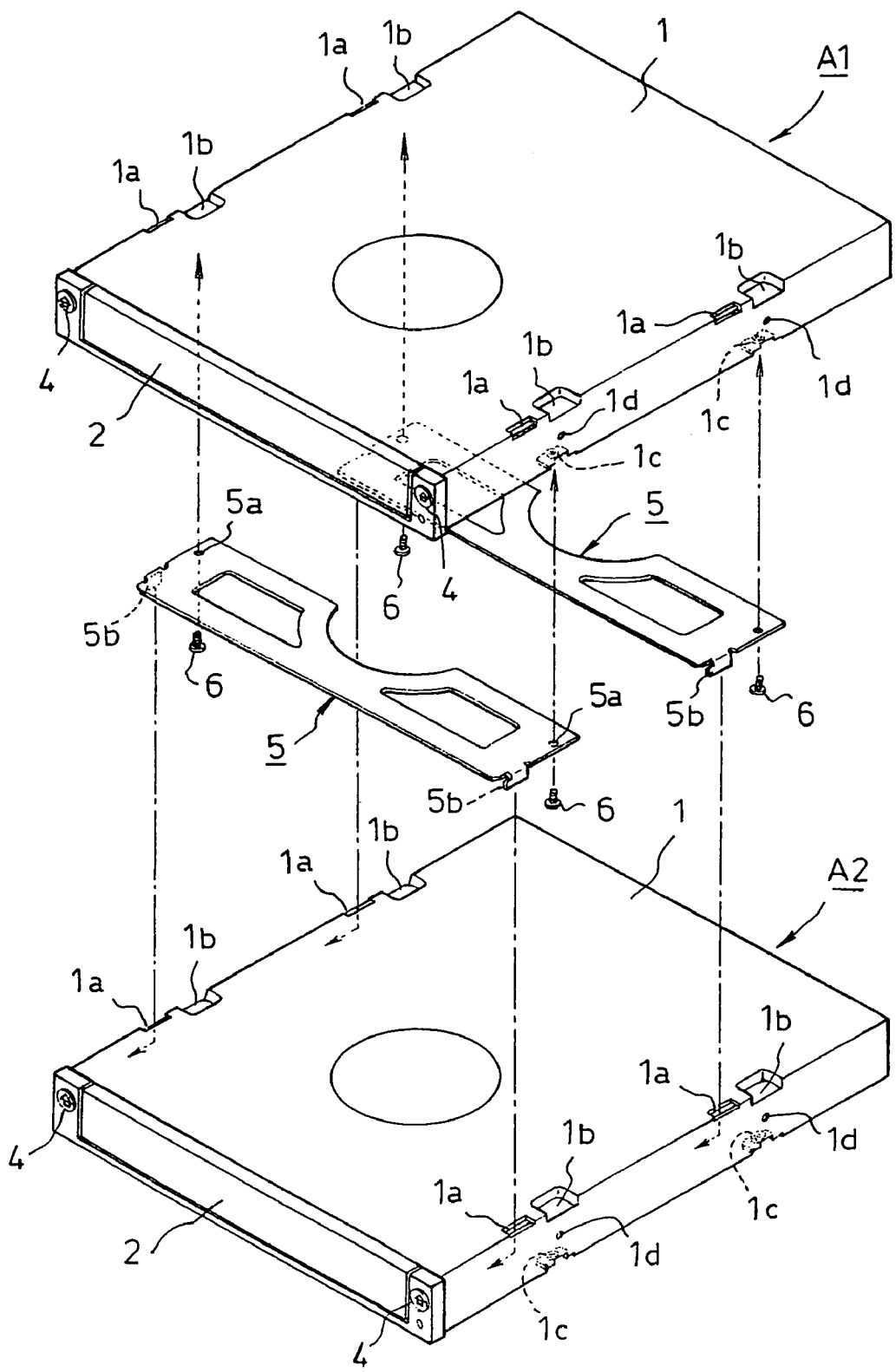
FIG. 4 is a perspective view illustrating two-stage structure of the disc device according to the embodiment of the invention.

The assembled state when two disc devices A configured as mentioned above are superimposed into a unitary block will now be described with reference to FIG. 4. As shown in FIG. 4, when a disc device of a upper stage is referred to as a first disc device A1, and another disc device which is referred to as a lower stage is a second disc device A2, since the bottom panel of the first disc device A1 and the top panel of the second disc device A2 are structurally connected to each other, connecting member 5 are used in this embodiment.

Figure 5:
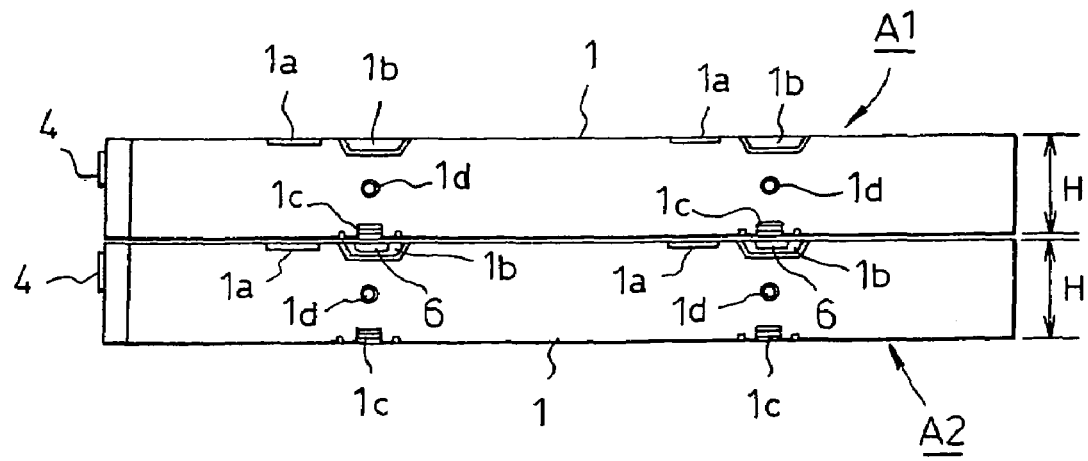
FIG. 5 is a side view of a finished state of the two-stage structure of the disc device according to the embodiment of the invention.

The connecting members 5 are formed in the form of plates, and have through-holes 5a and angle pieces 5b formed at its both ends, respectively. The above-described connecting members 5 are fixed to the bottom panel of the first disc device A1 by attaching screws 6, and the angle pieces 5b thereof protrude. Thereafter, the angle pieces 5b are inserted into slits 1a of the second disc device A2 to be slide thereto so that the top panel of the second disc device A2 is interposed between the angle pieces 5b. Therefore, both the first and second disc devices A1 and A2 are integrated into a unitary block as shown in FIG. 5. In order to prevent deviation of the assembled disc devices A1 and A2, the integrated unitary block is more securely formed by using means for fixing the connecting members at its back side.

Figure 6:
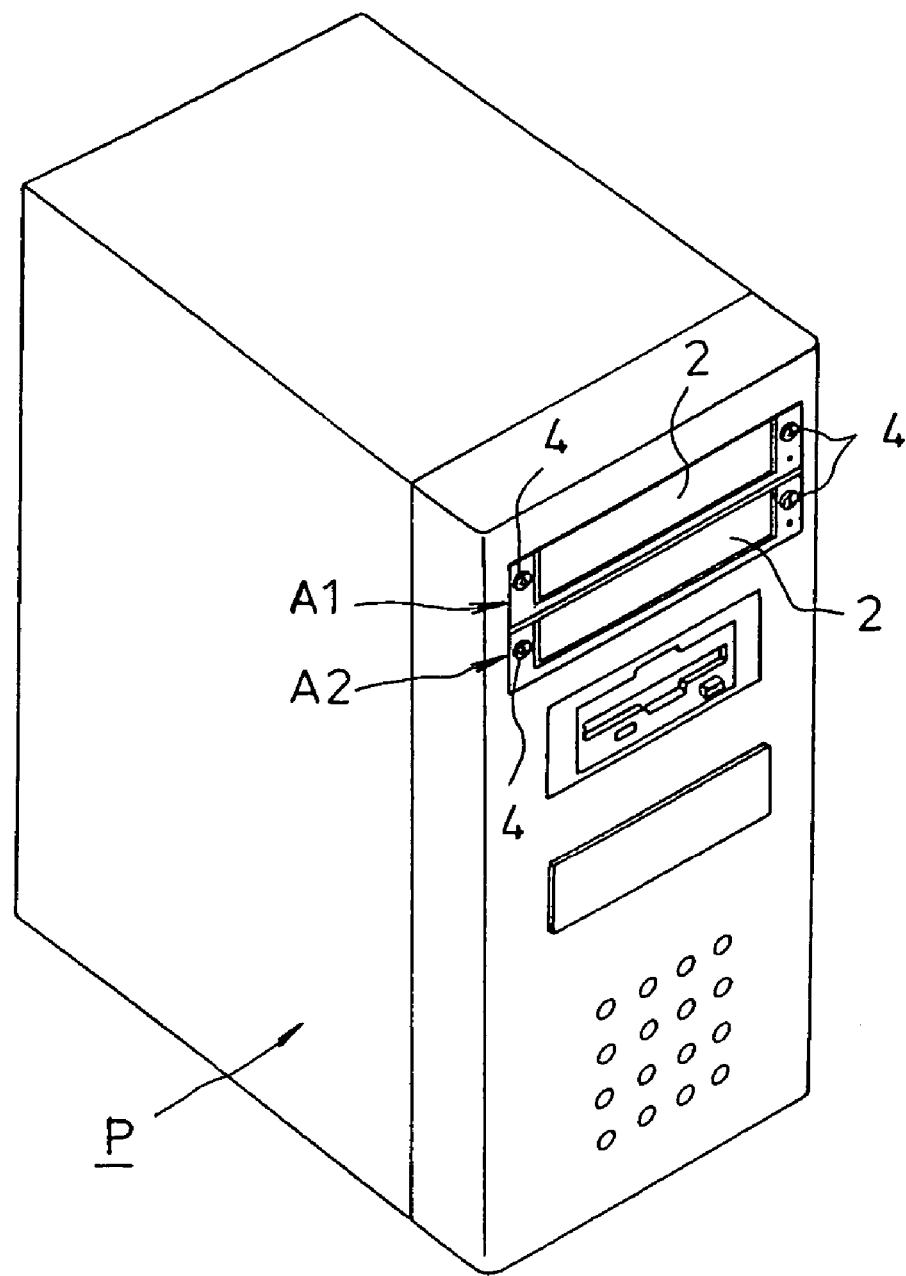
FIG. 6 is a perspective view of an assembled state of a disc device of a first embodiment of the invention into an information device.

When each of the above integrated disc devices A1 and A2 has a thickness of 20 mm, and the thickness of the connecting member 5 is 11 mm, the total thickness of the integrated unitary block of the devices is 41 mm. Therefore, it is possible to use in the half-height drive bay. By fixing the first or second disc device to the inner housing of the information device P such as a personal computer using the threaded holes 1d, it is further possible to arrange as shown in FIG. 6. This is similar to the second embodiment.

Since the connecting members 5 are formed so as to have smaller width than the disc device, the connecting members does not protrude toward the front of the disc device when being integrated with the disc devices. Therefore, in any case of single disc device or a combined disc device, since the width are constant, it is possible to be arranged in the half-height drive bay, and to be mounted in the information device P without any difficulty. Furthermore, when separate disc devices are horizontally superimposed in a unitary block, the devices can be formed such that the first disc device functions as a reproduce only disc device and the second disc device functions as a record only disc device.

Figure 7:
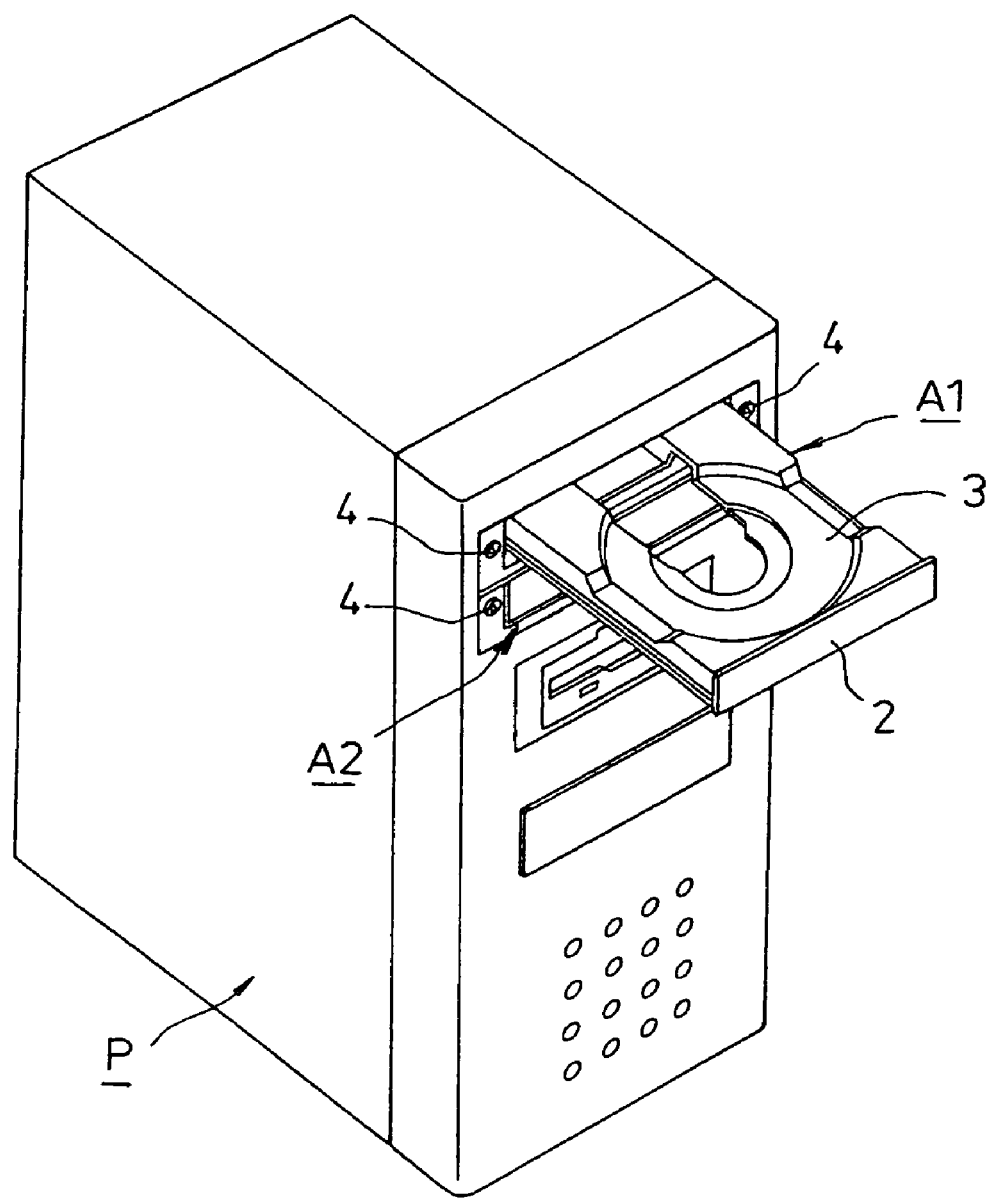
FIG. 7 is a perspective view illustrating a usage example of the disc device according to the first embodiment of the invention.
Figure 8:
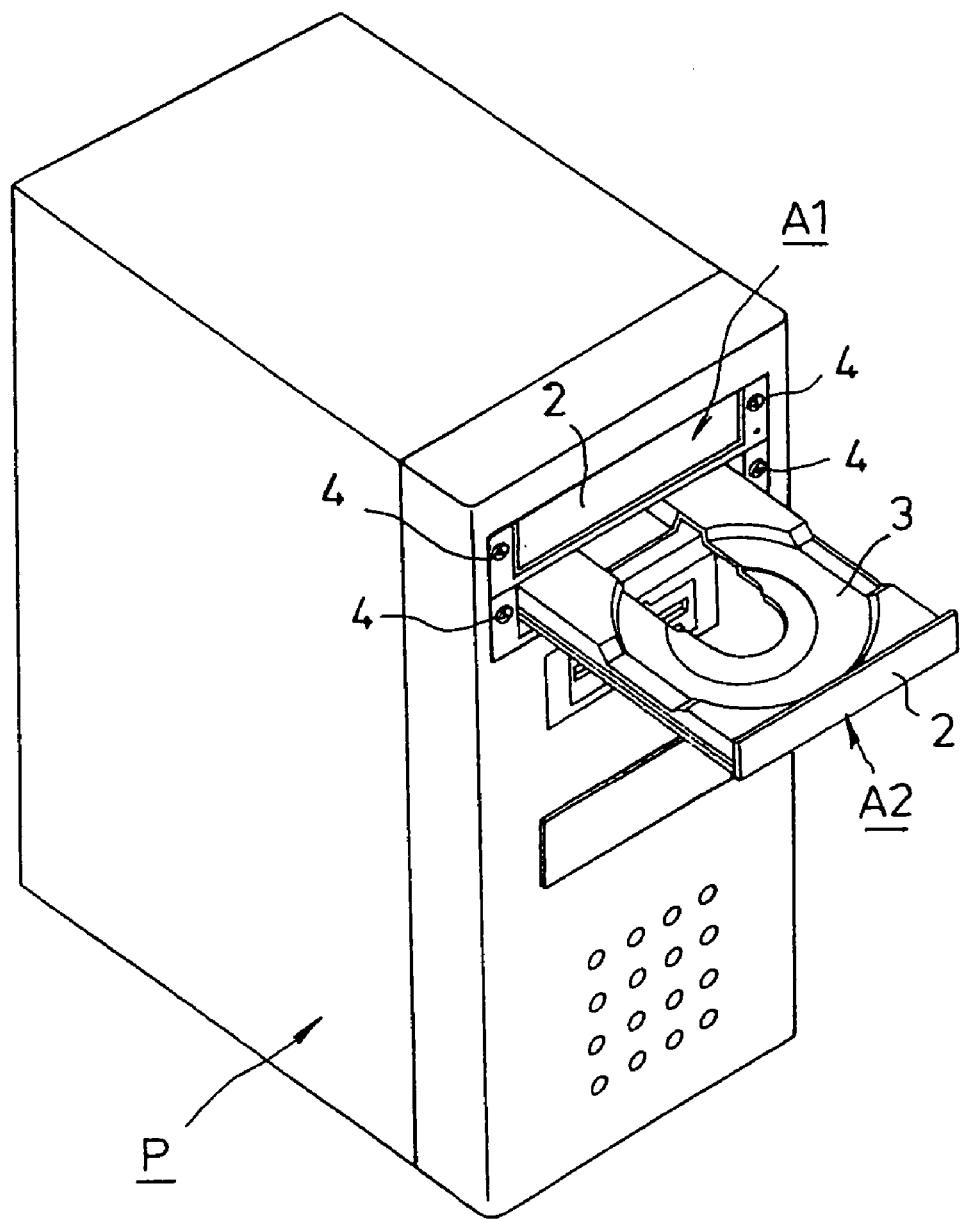
FIG. 8 is a perspective view illustrating a usage example of the disc device according to the first embodiment of the invention.

When the disc devices are horizontally superimposed in a unitary block as mentioned above, both disc devices are close to each other. Therefore, as shown in FIG. 7, when the disc tray 3 of the first disc device A1 is unloaded, the bezel 2 of the second disc device A2 is hidden. In addition, as shown in FIG. 8, when the disc tray 3 of the second disc device A2 is unloaded, the disc, tray 3 becomes an obstacle of operation of the first disc device A1.

In order to overcome the above-mentioned problems, according to the embodiment of the invention, push buttons for loading/unloading the disc tray 3 are provided on both sides of the bezel 2. Accordingly, even though a disc tray of one of the disc devices is unloaded, it is still possible to use the other disc device without any difficulty.

Furthermore, when one disc device according to the above embodiment is arranged in the half-height drive bay, a gap is formed over or below the disc device. In this case, it is possible to protect an appearance of the front face by covering the gap using an attachment member.

Second Embodiment

Next, a case that a pair of disc devices configured as same as the first embodiment are vertically superimposed in an information device will be explained.

When the disc devices are formed as a vertically long single body in the half-height drive bay, a gap is generated on the side of the disc device. However, in this case, it is possible to protect an appearance of the front face by covering the gap using an attachment member.

Figure 9:
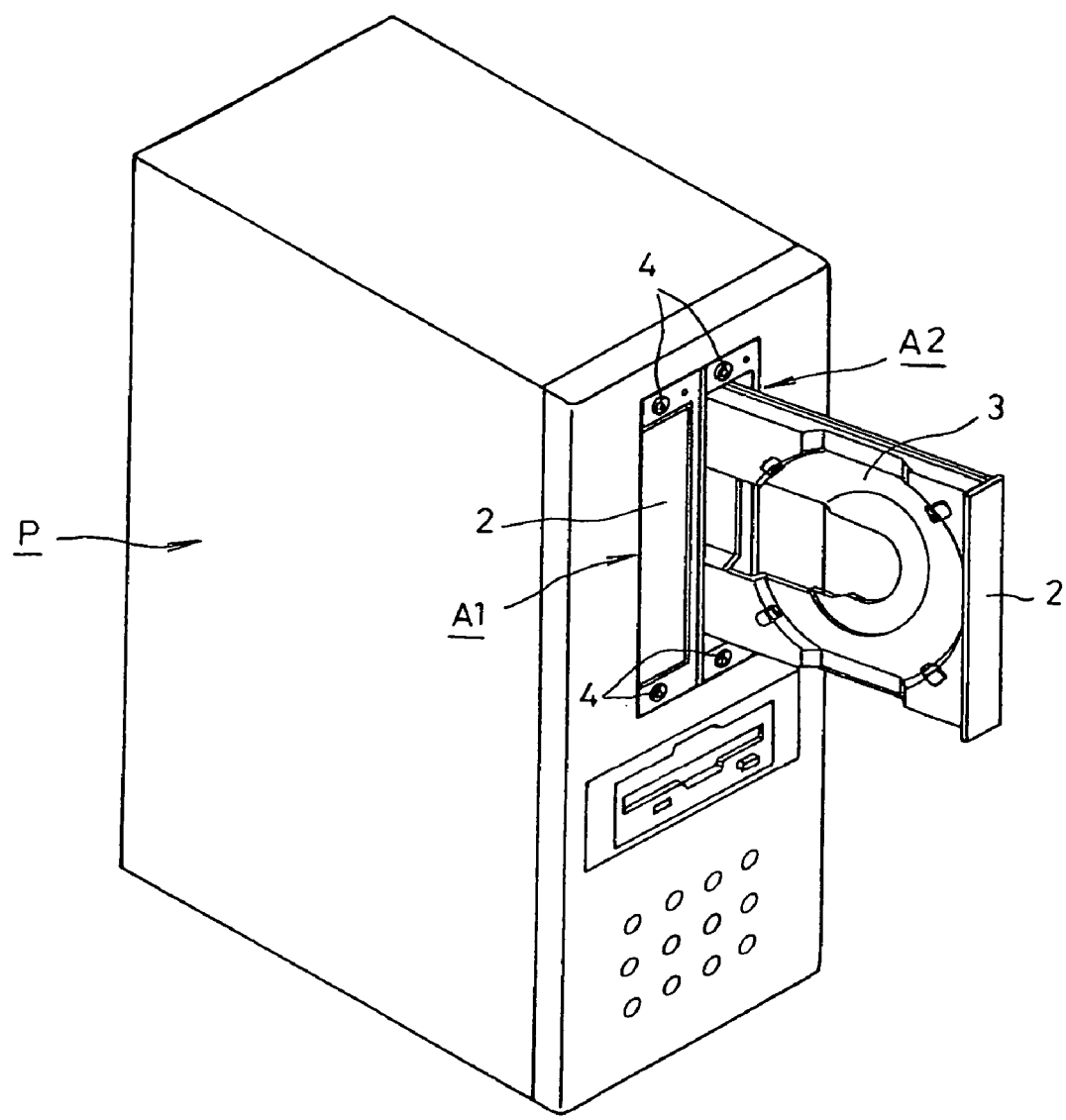
FIG. 9 is a perspective view illustrating a usage example of a disc device according to a second embodiment of the invention.

In the case of configuring according to the second embodiment, as shown in FIG. 9, when the disc tray 3 of the disc device A1 is unloaded in a state where the disc tray 3 of the disc device A2 is unloaded, since the surface of the disc tray 3 of the disc device A2 is hidden, it is difficult to perform mounting of the optical disc, and so on. Further, the operability may be lowered.

Figure 10:
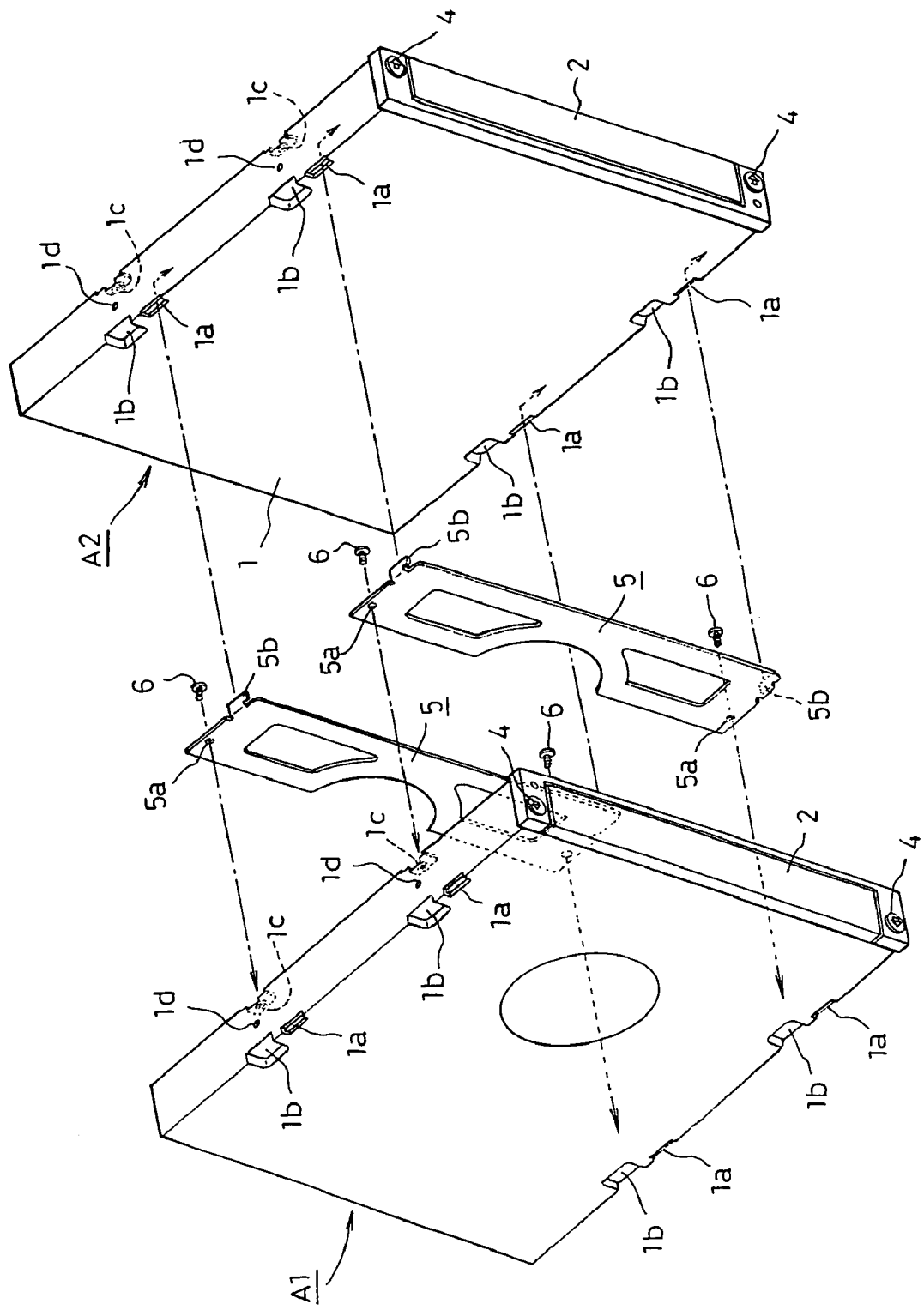
FIG. 10 is a perspective view of another assembled state of the disc device according to the second embodiment of the invention.

Therefore, according to the embodiment of the invention, the above-mentioned problems can be solved. Specifically, as shown in FIG. 10, slits 1a which pass through to the inside are formed at both sides of the bottom panel of the chassis case 1 of the second disc device A2. Recessed grooves 1b are formed in order to prevent contacting with the head of the attaching screws in the assembled state, and threaded holes 1c are formed in positions corresponding to the recessed grooves 1b in the top panel of the chassis case 1.

When the second disc device A2 formed as mentioned above is integrated with the first disc device A1, connecting members 5 are fixed to the bottom panel of the first disc device A1 through the attaching screw 6, and the angle pieces 5b protrude. Thereafter, the angle pieces 5b are inserted into the slits 1a of the second disc device A2 and slide to clamp the top panel of the second disc device A2 using the angle pieces 5b and to form the disc devices in a unitary block. Further, even in this case, in order to prevent deviation of the integrated disc devices A1 and A2, the unitary block can be securely formed by using means for fixing the connecting members at its back side.

Figure 11:
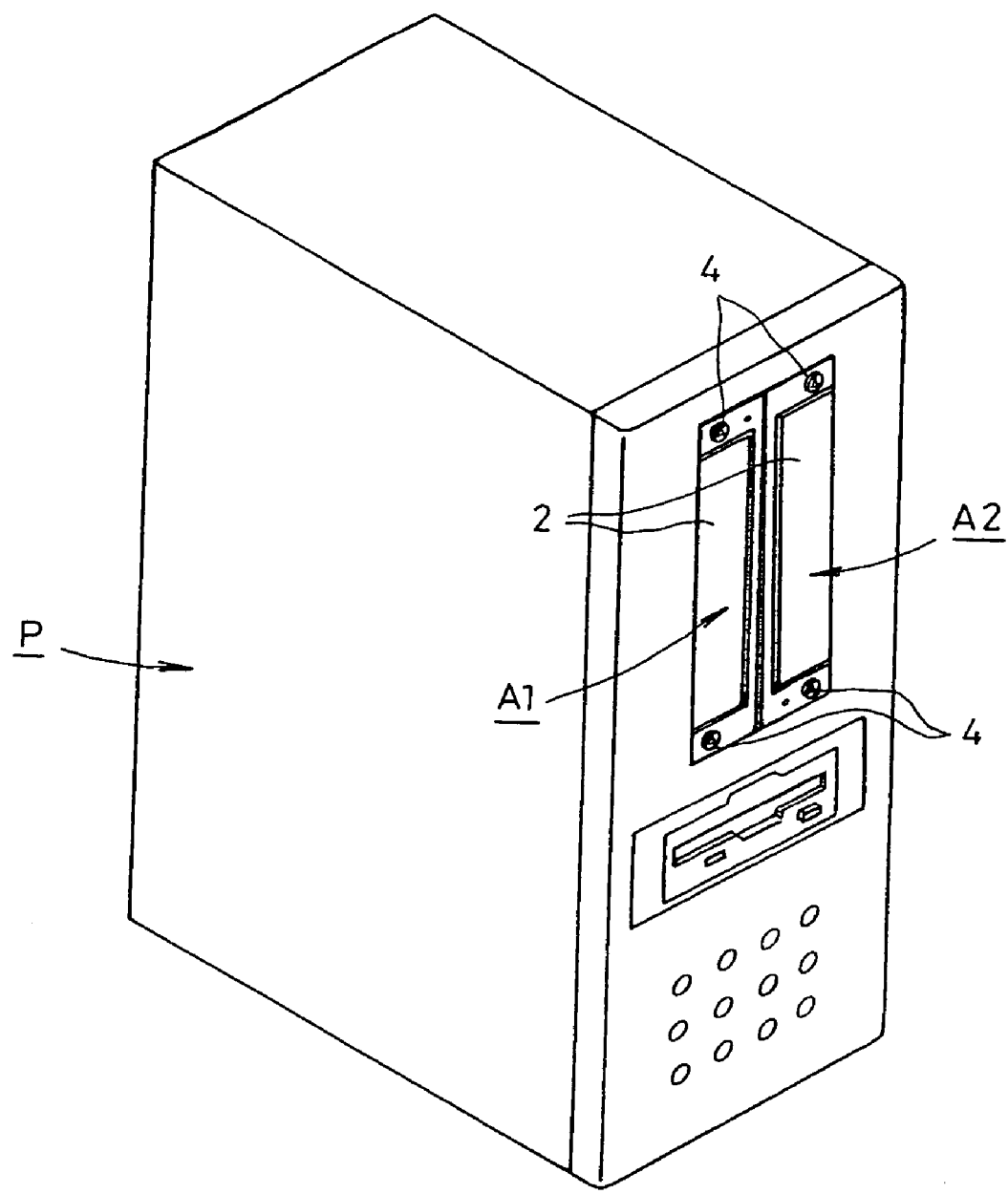
FIG. 11 is a perspective view of an assembled state of the disc device of the second embodiment of the invention into an information device.
Figure 12:
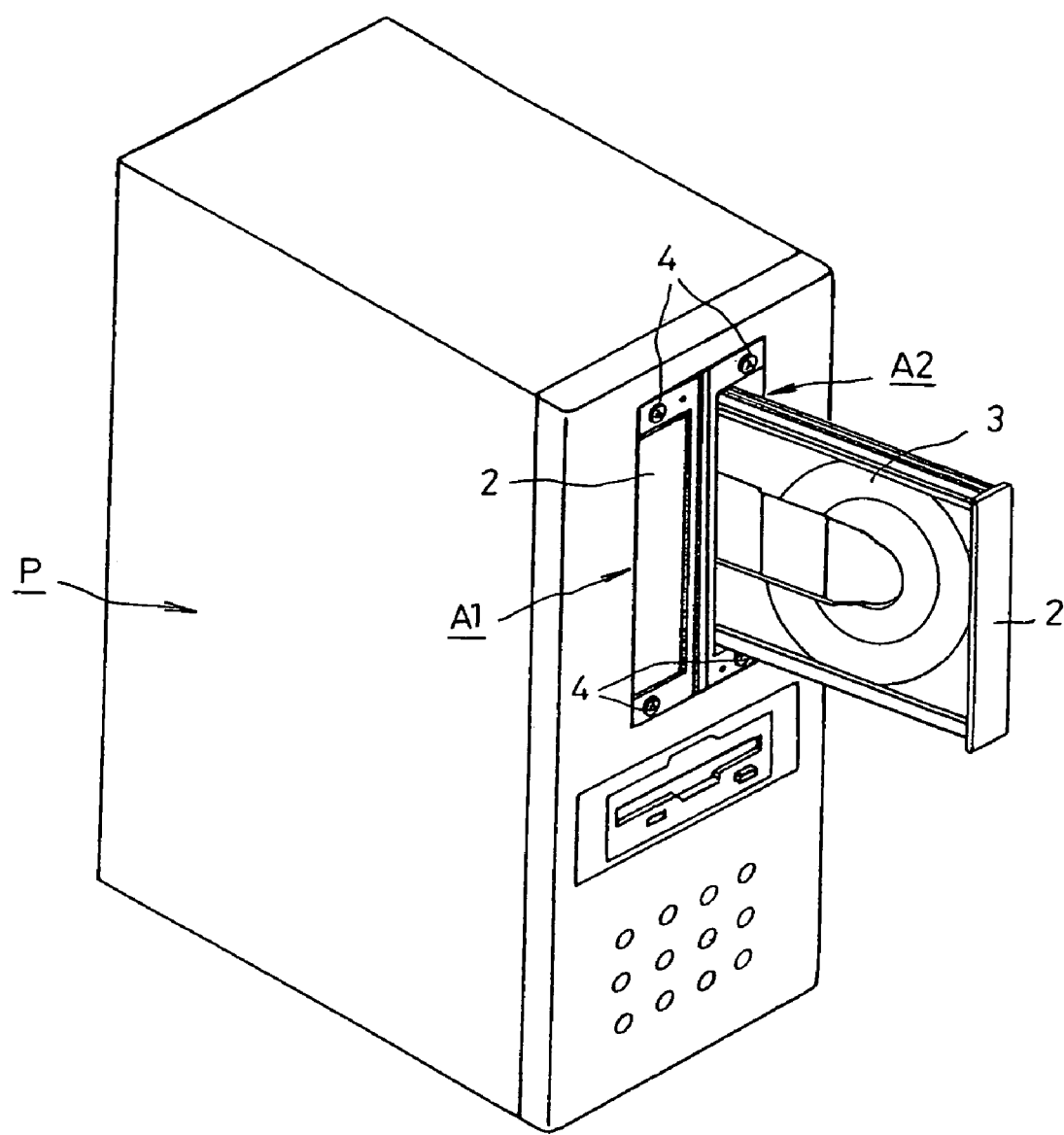
FIG. 12 is a perspective view illustrating a usage example of the disc device according to the second embodiment of the invention.
Figure 13:
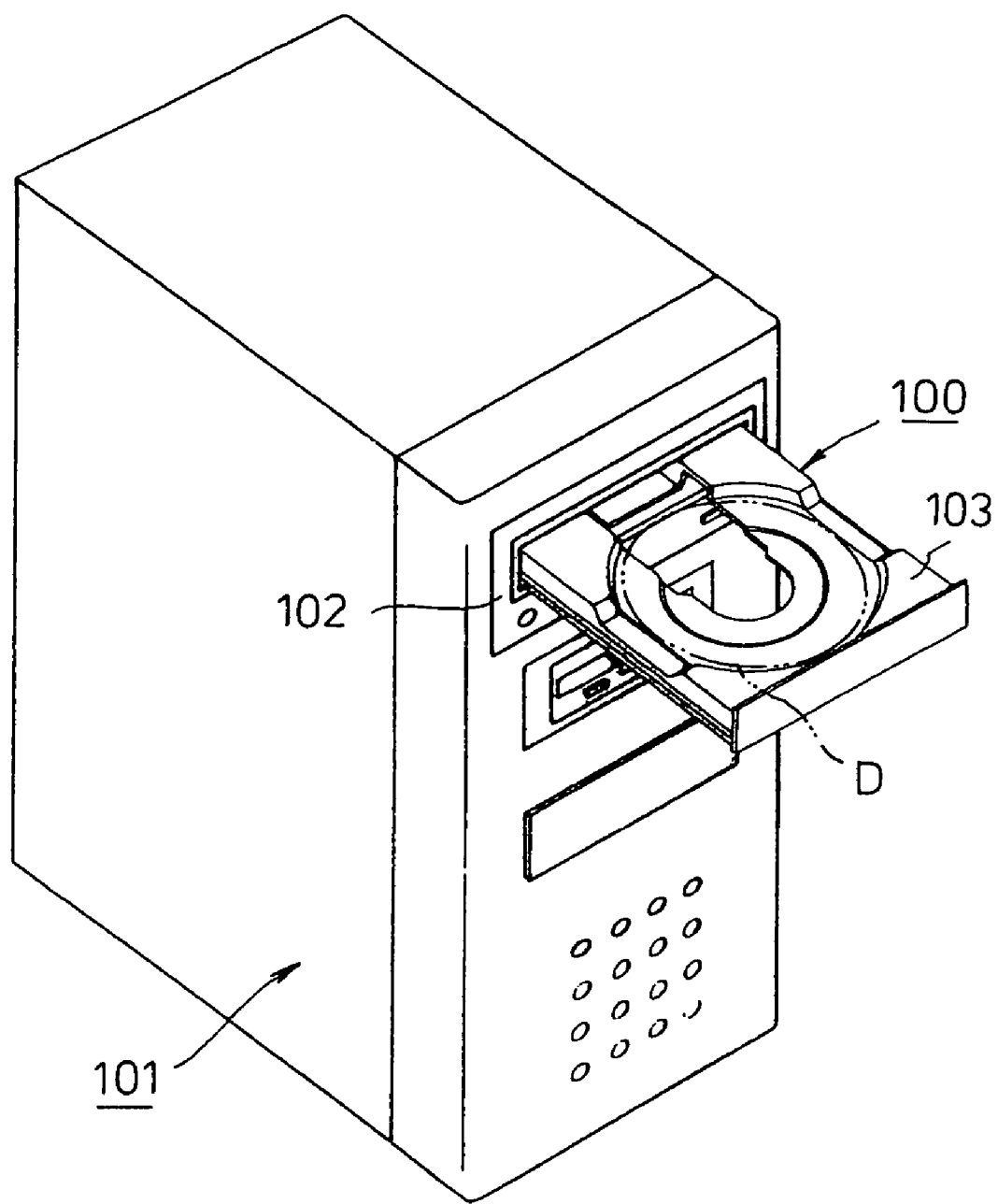
FIG. 13 is a perspective view showing a state that a disc device according to the related art is arranged in an information device.

When the unitary block of the disc devices A1 and A2 are arranged in the information device as shown in FIG. 11, surfaces of the disc trays oppose to each other. Therefore, as shown in FIG. 12, even when the disc tray is unloaded, one disc tray may not be hidden by the other disc tray. Furthermore, it is possible to simultaneously mount optical discs by simultaneously unloading the disc trays.

INDUSTRIAL APPLICABILITY

As described above, according to the first and fifth aspects of the invention, since the outline of the case has a thickness of 19 mm to 20.65 mm, and a width of 145.5 mm to 146.5 mm, the disc device can accept a single disc device or double disc devices horizontally or vertically in the half height drive bay.

According to the second aspect of the invention, since individual disc devices are formed in a unitary block by using the connecting member, it is possible to make the first or second device function as a reproducing or recording disc device. Further, the disc device can be superimposed flexibly in any of a horizontal direction and a vertical direction. Furthermore, it is possible to improve the function of the information device without increasing the volume for mounting the disc device.

According to the third aspect of the invention, a pair of disc devices configured so as to be combined can be integrated into a unitary block by opposing cases, and the outline of the case may be fitted in an opening of the drive bay.

According to the sixth aspect of the invention, by providing push buttons for loading/unloading the disc trays at both side ends of a bezel, even though a disc tray of one of the disc devices is unloaded, it is possible to use the other disc device without any difficulty.

What is claimed is:

1. A disc apparatus, comprising:
    a pair of disc devices combined vertically or horizontally, arranged in a half-height drive bay configured in a front face of an information device;
    a first panel of a first case of a first device of the pair of disc devices;
    a second panel of a second case of a second device of the pair of disc devices;
    wherein at least one of the first or second cases has at least one threaded hole at a side of the at least one case for mounting onto a main body of the information device; and
    wherein the first panel and the second panel are integrated by a connecting means attached to the first panel and the second panel;
    wherein the connecting means includes a protruded portion for clamping the second panel thereto;
    wherein the connecting means is interposed between the first panel and the second panel;
    wherein the second panel includes a slit portion; and
    wherein the protruded portion is inserted into the slit portion of the second panel and slid to clamp the second panel on the connecting means.

2. The disc apparatus according to claim 1:
    wherein the first panel of the first case of the first device and the second panel of the second case of the second device are integrated by the connecting means for engaging both panels with each other to be arranged in the half-height drive bay;
    wherein the protruded portion has at least one angle piece formed at one or more ends of the connecting means; and
    wherein the slit portion has at least one slit passing through to the inside of the second panel and formed at one or more sides of the second panel.

3. The disc apparatus according to claim 1, wherein the cases of the pair of disc devices are integrated by opposing the cases to fit an outline in an opening of the half-height drive bay.

4. The disc apparatus according to claim 3, wherein the first panel and the second panel of the cases of the pair of disc devices are opposed to each other.

5. The disc apparatus according to claim 4, wherein the first device comprises a first disc tray having a third surface for putting a first disc, the second device comprises a second disc tray having a fourth surface for putting a second disc, and the third surface and the fourth surface are opposed to each other.

6. The disc apparatus according to claim 3, wherein the outline of the case of a single device of the pair of the disc devices has a thickness of 19 mm to 20.54 mm, and a width of 145.5 mm to 146.5 mm.

7. The disc apparatus according to claim 1, wherein push buttons for loading/unloading a disc tray are provided at both side ends of a bezel.

8. A disc device to be arranged in a drive bay configured in an information device, comprising:
    a first disc drive and a second disc drive;
    wherein a first panel of a case of the first disc drive and a second panel of a case of the second disc drive are integrated by a connecting means attached to the first panel and the second panel for engaging both panels with each other to be arranged in the drive bay;
    wherein the connecting means includes a protruded portion for clamping the second panel thereto;
    wherein the connecting means is interposed between the first panel and the second panel;
    wherein the second panel includes a slit portion; and
    wherein the protruded portion is inserted into the slit portion of the second panel and slid to clamp the second panel on the connecting means.

9. The disc device according to claim 8, wherein an outline of the cases of the first and second integrated disc drives is fitted in an opening of the drive bay.

10. The disc device according to claim 8, wherein the first panel and the second panel of the cases of the first and second disc drives are opposed to each other.

11. The disc device according to claim 8, wherein an outline of the case of a single disc drive has a thickness of 19 mm to 20.65 mm, and a width of 145.5 mm to 146.5 mm.

12. The disc device according to claim 8, wherein push buttons for loading/unloading a disc tray of each disc drive are provided at both side ends of a bezel.

13. The disc apparatus according to claim 8:
  wherein the protruded portion has at least one angle piece formed at one or more ends of the connecting means; and
  wherein the slit portion has at least one slit passing through to the inside of the second panel and formed at one or more sides of the second panel.

* * * * *